US012189608B2

(12) United States Patent
Mishra et al.

(10) Patent No.: US 12,189,608 B2
(45) Date of Patent: Jan. 7, 2025

(54) SYSTEM AND METHOD OF IDENTIFYING EVENT AS ROOT CAUSE OF DATA QUALITY ANOMALY

(71) Applicant: Visa International Service Association, San Francisco, CA (US)

(72) Inventors: Shashwat Mishra, NawabGanj (IN); Shreyash Rammohan Hisariya, Mahadevpura (IN); Mrigank Mrigank, Bengaluru (IN); Nanada Kishore Thatikonda, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 443 days.

(21) Appl. No.: 17/414,921

(22) PCT Filed: Dec. 19, 2018

(86) PCT No.: PCT/US2018/066540
§ 371 (c)(1),
(2) Date: Jun. 16, 2021

(87) PCT Pub. No.: WO2020/131052
PCT Pub. Date: Jun. 25, 2020

(65) Prior Publication Data
US 2022/0067022 A1 Mar. 3, 2022

(51) Int. Cl.
*G06F 16/00* (2019.01)
*G06F 16/215* (2019.01)
*G06F 16/23* (2019.01)

(52) U.S. Cl.
CPC ........ *G06F 16/2365* (2019.01); *G06F 16/215* (2019.01)

(58) Field of Classification Search
CPC ........................... G06F 16/2365; G06F 16/215
See application file for complete search history.

(56) References Cited

U.S. PATENT DOCUMENTS 7,111,205 B1  9/2006 Jahn et al.
7,310,590 B1  12/2007 Bansal
(Continued)

FOREIGN PATENT DOCUMENTS

CN  102129372 A  7/2011
CN  103955505 A  7/2014
(Continued)

OTHER PUBLICATIONS

Vassiliadis, Panos. "Data warehouse modeling and quality issues." National Technical University of Athens Zographou, Athens, Greece (2000).*

(Continued)

*Primary Examiner* — Nan Hutton
(74) *Attorney, Agent, or Firm* — Kilpatrick Townsend & Stockton LLP (57) ABSTRACT

Embodiments detect and predict data disparity issues in data warehouses. Embodiments derive meaningful insights about the events occurred prior to the data disparity and correlate the events to understand the root cause of the data disparity (or the root cause of an alert generated as a result of detecting the data disparity). Embodiments either take or recommend actionable measures to prevent further occurrences of the event identified as the root cause. According to various embodiments, when the monitored data is transaction data (e.g. transaction volume, transaction amount, transaction processing speed, etc.), internal events (e.g. data job failures, job delays, job server maintenances) or external events (e.g. seasonal holiday events, natural calamities) may cause a dip or spike in the transaction data resulting in a data quality anomaly (i.e. a data disparity).

19 Claims, 9 Drawing Sheets

(56) References Cited

U.S. PATENT DOCUMENTS

| | | | |
|---|---|---|---|
| 2010/0100775 A1 | 4/2010 | Slutsman | |
| 2013/0061095 A1 | 3/2013 | Caffrey | |
| 2013/0097463 A1 | 4/2013 | Marvasti | |
| 2013/0305356 A1* | 11/2013 | Cohen-Ganor | H04L 63/1416 726/22 |
| 2017/0070414 A1* | 3/2017 | Bell | H04L 43/16 |
| 2017/0075749 A1 | 3/2017 | Ambichl et al. | |
| 2017/0235626 A1 | 8/2017 | Zhang et al. | |
| 2018/0039895 A1 | 2/2018 | Wang et al. | |
| 2018/0113773 A1 | 4/2018 | Krishnan et al. | |
| 2018/0276063 A1* | 9/2018 | Mendes | G06F 11/3409 |

FOREIGN PATENT DOCUMENTS

| | | |
|---|---|---|
| CN | 106294865 A | 1/2017 |
| CN | 108989132 A | 12/2018 |
| WO | 2015168071 A1 | 11/2015 |
| WO | 2018160177 | 9/2018 |

OTHER PUBLICATIONS

Singh, Ranjit, and Kawaljeet Singh. "A descriptive classification of causes of data quality problems in data warehousing." International Journal of Computer Science Issues (IJCSI) 7.3 (2010): 41.*

Application No. EP18943566.2, Extended European Search Report, Mailed on Nov. 25, 2021, 10 pages.

Application No. PCT/US2018/066540, International Search Report and Written Opinion, Mailed on Sep. 18, 2019, 11 pages.

Harper, et al., "The Application of Neural Networks to Predicting the Root Cause of Service Failures", 2017, pp. 953-958.

"Alert Correlation Rules", Service Now Docs, http:/docs.servicenow.com/bundle/kingston-it-operationns-management/page/product/eve, Aug. 31, 2018, 3 pages.

Costa, et al. "Forecasting Time Series Combining Holt-Winters and Bootstrap Approaches", AIP Conference Proceedings, 1648, 110005, (2015), 5 pages.

Application No. EP18943566.2, Office Action, Mailed on Feb. 23, 2023, 9 pages.

Application No. SG11202106336V, Written Opinion, Mailed on Nov. 15, 2022, 12 pages.

Application No. CN201880100130.9, Office Action, Mailed on Jan. 4, 2024, 14 pages.

Mao et al., "M-TAEDA: Temporal Abnormal Event Detection Algorithm for Multivariate Time-series Data of Water Quality", Journal of Computer Applications, vol. 37, No. 1, Jan. 10, 2017, pp. 138-144.

EP18943566.2, "Summons to Attend Oral Proceedings", May 8, 2024, 10 pages.

Application No. SG11202106336V, Further Written Opinion, Mailed on Apr. 22, 2024, 8 pages.

Application No. CN201880100130.9, Notice of Decision to Grant, Mailed on Jul. 8, 2024, 6 pages.

* cited by examiner

SYSTEM AND METHOD OF IDENTIFYING EVENT AS ROOT CAUSE OF DATA QUALITY ANOMALY

The present application is a 371 application of International Application No. PCT/US2018/066540, filed of Dec. 19, 2018, entitled "SYSTEM AND METHOD OF IDENTIFYING EVENT AS ROOT CAUSE OF DATA QUALITY ANOMALY", the entire content of which is hereby incorporated by reference for all purposes.

BACKGROUND OF THE INVENTION

Various internal and external factors may account for the failure of a data quality check at a data warehouse. Conventional mechanisms that only report a "pass" or "fail" status do not help organizations to understand the root cause of the data quality anomaly and do not provide insight for fixing the underlying issue. In order to get a full understanding of the underlying issue causing the data quality check to fail, the event(s) that triggered the data quality check fail alarm must be identified accurately, analyzed and addressed.

Embodiments of the invention address these and other problems, individually and collectively.

BRIEF SUMMARY OF THE INVENTION

Embodiments provide a method for identifying a cause of data disparity among monitored data. The method includes monitoring, using a server computer, parameters associated with data collected in connection with a processing computer. The method also includes detecting a data disparity among the data, and identifying a first event associated with the data disparity. A set of events associated with the first event may be identified. A score for each event among the set of events may be calculated as a function of a weight assigned to each event among the set of events and occurrence score determined for each event among the set of events. A second event among the set of events may be identified as the cause of the data disparity. The second event may have the highest score among the set of events. The method may also include taking preventive actions to prevent the data disparity in view of the identified cause of the data disparity.

In some embodiments, the occurrence score a selected event is determined based on runtime characteristics of all child events and parent events of the selected event. The selected event occurred prior to the all child events of the selected event, and all parent events of the selected occurred prior to the selected event.

According to some embodiments, the method may also include, prior to taking the preventive actions, identifying a third event, different than the second event, as an actual cause of the data disparity. If the third event is included in the set of events, the method may include adjusting the weight of each event among the set of events by a predetermined amount, wherein adjusting includes increasing the weight of the third event. If the third event is not included in the set of events, the method may include adding the third event to the set of events, and adjusting the weight of each event among the set of events by a predetermined amount, where adjusting includes increasing the weight of the third event. In both cases, the score for each event among the set of events may then be recalculated. The method may include two or more iterations of adjusting and recalculating, where the score of the third event increases at each iteration such that the third event has the highest score among the set of events at conclusion of all iterations.

In some embodiments, the weight of a given event is stored along with a history of the given event being the actual cause of the data disparity. The set of events associated with the first event may include one or more parent events of the first event, wherein the one or more parent events occurred prior to the first event. The first event and the set of events may include one or more of an internal event to the processing computer and an external event to the processing computer.

In some embodiments, the method may also include receiving an alert associated with the data disparity, and in response to the alert, identifying the first event associated with the data disparity.

According to embodiments, the first event and the set of events may form a dependency graph. The method may further include adding a new event to the dependency graph. The new event may be associated with a third event and a fourth event in the set of events, and the fourth event may be a descendent of the third event. The new event may then be associated in the dependency graph with the third event without being associated with the fourth event.

Embodiments may further include a computer comprising a processor, and a computer readable medium, the computer readable medium comprising code that, when executed by the processor, cause the processor to perform the above described method.

These and other embodiments are described in further detail below.

DETAILED DESCRIPTION OF THE INVENTION

Following discussions of some terms may be useful in embodiments of the invention.

An "event" may refer to an occurrence that has an impact on an amount of and/or processing speed associated with data being processed by a server and/or at a data warehouse. The event may be an event within the data warehouse, referred as an internal event, or outside the data warehouse, referred as an external event.

A "root cause" may include an initiating cause of either a condition or a causal chain that leads to an outcome or effect of interest such as a data quality anomaly observed at a data warehouse. Root cause analysis (RCA) may refer to a method of problem solving used for identifying the root cause of a fault or problem (e.g. data disparity or data quality anomaly). An event may be a root cause if removal thereof from the problem-fault-sequence prevents the final undesirable outcome from recurring.

A "dependency graph" may include a graph representing dependencies of several objects (e.g. events) among each other. An exemplary dependency graph may include a directed graph. A directed graph may be an ordered pair G=(V, A) where V represents nodes and A represents vertices.

A "processor" may include any suitable data computation device or devices. A processor may comprise one or more microprocessors working together to accomplish a desired function. The processor may include CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

As used herein, the term "system" may refer to one or more computing devices or combinations of computing devices, such as but not limited to processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications.

Embodiments are directed to systems and methods for detecting and predicting data disparity issues in data warehouses. In some embodiments, the systems and methods may implement a machine learning model for identifying a root case of the data disparity. Embodiments derive meaningful insights about the events occurred prior to the data disparity and correlate the events to understand the root cause of the data disparity (or the root cause of an alert generated as a result of detecting the data disparity). Embodiments either take or recommend actionable measures to prevent further occurrences of the event identified as the root cause. According to various embodiments, when the monitored data is transaction data (e.g. transaction volume, transaction amount, transaction processing speed, etc.), internal events (e.g. data job failures, job delays, job server maintenances) or external events (e.g. seasonal holiday events, natural calamities) may cause a dip or spike in the transaction data resulting in the data disparity (e.g. a data quality anomaly).

Embodiments provide probabilistic metrics about the events being a root cause for the generated alert based upon performance measures of the events and dependencies among events. The events may be ranked based on probabilities of the events occurring or failing. According to various embodiments, a dependency graph may be formed based on the identified plurality of events. Each node in the dependency graph may represent an event. A given event may have one or more parent events that occurred prior to the given event. A given event may also have one or more child events that occur after the given event.

Figure 1:
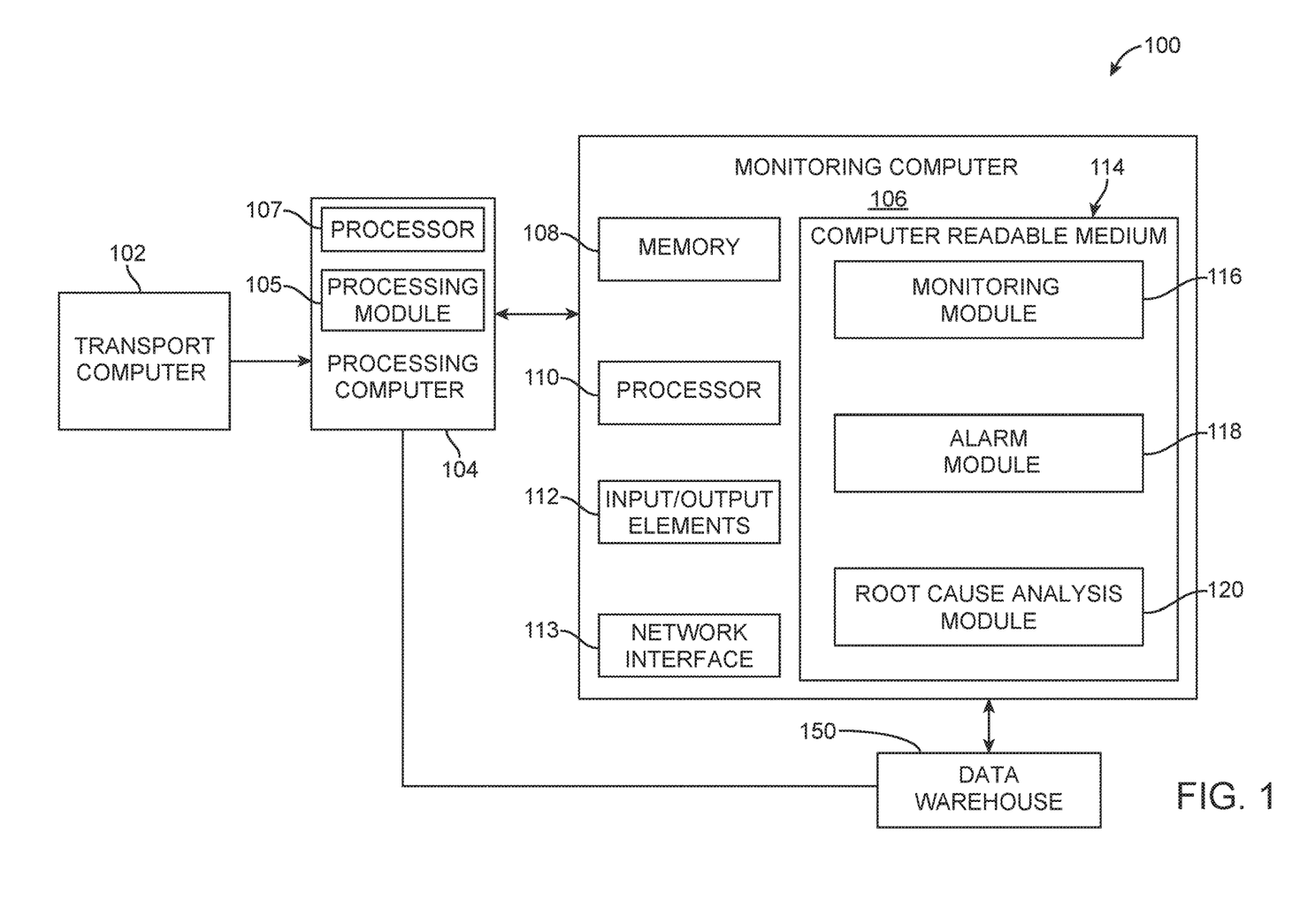
FIG. 1 illustrates an exemplary data analysis system for identifying a root cause of a data quality anomaly at a data warehouse, according to various embodiments.

According to various embodiments, the analysis (e.g. a machine learning model) for identifying the root cause of a data quality anomaly detected at a data warehouse may be performed using an exemplary data analysis system 100 illustrated in FIG. 1. The system 100 may include a monitoring computer 106 coupled to and monitoring a data warehouse 150. The monitoring computer 106 may be internal or external (i.e. remote) to the data warehouse 150. The data warehouse 150 may receive data from a processing computer 104. According to various embodiments, the data may be transaction data and the processing computer 104 may be a transaction processing network computer 104. The data may be transmitted from a transport computer 102 to the processing computer 104, and proceed at the processing computer 104. The processing computer 104 may store and/or process data at the data warehouse 150.

For simplicity of illustration, a certain number of components are shown in FIG. 1. However, it should be appreciated that embodiments of the invention may include more than one of each component. In addition, some embodiments of the invention may include fewer than or greater than all of the components shown in FIG. 1. In addition, the components in FIG. 1 may communicate via any suitable communication medium using any suitable communications protocol.

The transport computer 102, the processing computer 104, the data warehouse 150 and the monitoring computer 106 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

According to various embodiments where data stored and/or processed at the data warehouse is transaction data, the transport computer 102 may be associated with a business entity (e.g., a commercial bank) that has a business relationship with a particular resource provider (e.g., a merchant) or other entity and that may be involved in the process of transaction. The transport computer 102 may issue and manage accounts for resource providers and exchange funds with the business entity computer on behalf of a resource provider. Some entities can perform both transport computer 102 and business entity computer functions. Embodiments of the present invention encompass such single entity transport/authorizing entity computers. In some embodiments, transport computer 102 may be configured to send/receive data to/from processing computer 104 (e.g., data received in an authorization request message or another message).

The processing computer 104 may be configured to process transaction between a user (e.g., utilizing a user device) and the resource provider. In some examples, the processing computer 104 may be configured to conduct a settlement process between the transport computer 102 associated with an acquirer (e.g., a financial institution associated with the resource provider) and the business entity computer associated with a business entity (e.g., a financial institution associated with the user).

The processing computer 104 may include data processing subsystems, networks, and operations used to support and deliver authorization services, exception file services, and clearing and settlement services. For example, the processing computer 104 may comprise a server coupled to a network interface (e.g., by an external communication interface), and databases of information. The processing computer 104 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing computer 104 may use any suitable wired or wireless network, including the Internet.

According to various embodiments, the monitoring computer 106 may monitor the data received, processed, stored and/or transmitted by the processing computer 104 and/or the data warehouse 150. The monitoring computer 106 may comprise a memory 108, a processor 110, input/output elements 112, a network interface 113, and a computer readable medium 114.

The computer readable medium 114 may comprise a number of components such as a monitoring module 116, an alarm module 118, and a root cause analysis module 120. More or fewer components are contemplated. It should also be appreciated that the components depicted in FIG. 1 may be combined to perform the functionality described herein. The computer readable medium 114 may also comprise code, executable by the processor 110 for implementing the methods discussed herein.

The processing computer 104 may include a processor 107 a processing module 105 comprising code that, when executed, causes the processor 107 to send and/or receive authorization request messages and/or authorization response messages from any suitable source to any suitable destination. By way of example, the processing module 105 may be configured to cause the processor 107 to receive an authorization request message from the transport computer 102. In some embodiments, the processing module 105 may be configured to cause the processor 107 to transmit the authorization request message to any suitable destination such as the business entity computer. The processing module 105 may be further configured to receive an authorization response message from any suitable source (e.g., the business entity computer) and transmit the authorization response message to any suitable destination (e.g., the transport computer 102).

The processing module 105 may further comprise code that, when executed, causes the processor 107 to perform any suitable operations utilizing, at least, transaction data included in an authorization request message. In some embodiments, the transaction data (e.g., account identifier, merchant information such as a location identifier for the merchant and/or transaction, an amount associated with the transaction, etc.) included in a particular authorization request message may be communicated to the processing module 105. The processing module 105 may be configured to perform any suitable operations utilizing such data.

According to various embodiments, the monitoring module 116 may be configured to monitor data received by the processing computer 104 and/or the data warehouse 150. For example, the monitoring module 116 may monitor the amount of data, processing speed of the incoming data, etc. When the monitoring module 116 detects an anomaly on the data quality (e.g. data processing speed being below a predetermined threshold, the incoming data being below or above a predetermined processing capacity threshold by a predetermined amount, etc.), the monitoring module 116 may notify the alarm module 118. The alarm module 118 may generate an alarm indicating the data quality anomaly. The root cause analysis module 120 may then perform an analysis (e.g. by implementing a machine learning model) to determine the root cause of the identified data quality anomaly, and, where applicable, propose remedial or preventative measures to address the data quality anomaly.

According to various embodiments, the analysis performed by the root cause analysis may include identifying an event E represented by a node in a dependency graph illustrating inter-relationships between events associated with the data. The analysis may then proceed with identifying all parent nodes (i.e. ancestors) of the event E recursively in the dependency graph, and identifying parent events P and child events C of each node of the identified parent nodes. For example, an exemplary job(E) may have a parent job(P) and a child job(C).

Figure 2A:
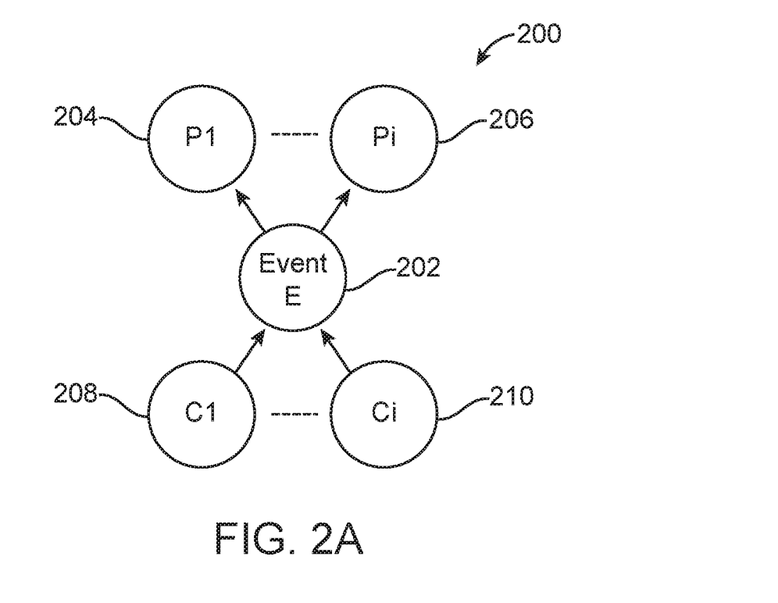
FIG. 2A illustrates an exemplary dependency graph including an event node, parent nodes, and child nodes, according to various embodiments.

FIG. 2A illustrates an exemplary dependency graph 200 including an event node 202, parent nodes P1 204 through Pi 206, and child nodes C1 208 through Ci 210. A given node of the dependency graph 200 illustrates an event that can impact the system (e.g. the processing computer 104 and/or the data warehouse 150 in FIG. 1). An exemplary event (E) 202 and may refer to something that has occurred or failed. According to various embodiments, events may be categorized into two classes: internal events and external events. Exemplary internal events may refer to occurrences within the data warehouse such as a job failure (e.g. a job fails to complete execution), a job delay (e.g. a job is not completed within the time allocated), a server maintenance, a hardware failure, etc. Exemplary external events may refer to occurrences outside the data warehouse that will have an impact on the amount of data being processed such as holidays, disasters, festivals, sports events, other entertainment events, etc.

Figure 2B:
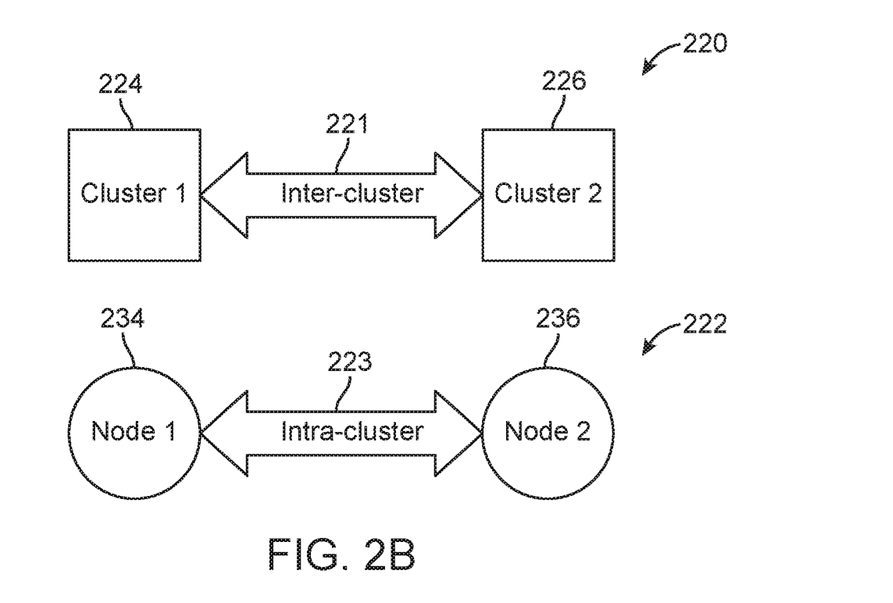
FIG. 2B illustrates inter-cluster dependency and intra-cluster dependency, according to various embodiments.

According to various embodiments, a plurality of nodes of the dependency graph may form a cluster. A cluster may refer to a collection of similar type of nodes. For example, a job cluster may include nodes that all represent jobs, a maintenance cluster may include nodes that all represent maintenance events, a special events cluster may include nodes that all represent external events, etc. FIG. 2B illustrates an inter-cluster dependency 220 (i.e. dependency among nodes from different clusters) and an intra-cluster dependency 222 (i.e. dependency among nodes of a given cluster). Arrows 221 and 222 represent dependencies of a node on another node. For example, arrow 221 represents dependency of node 224 from a first cluster on node 226 from a second cluster, and vice versa. Arrow 223 represents dependency of a first node 234 from a first cluster on a second node 236 from the same first cluster, and vice versa.

Figure 3:
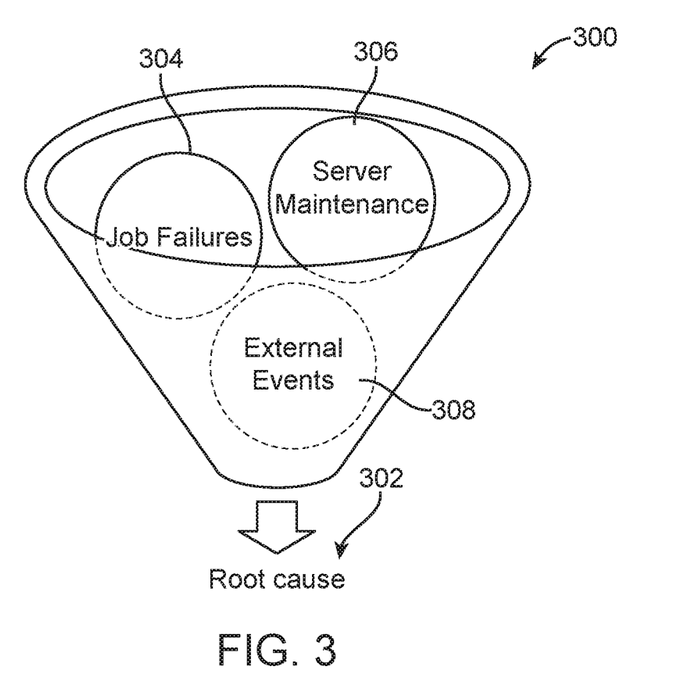
FIG. 3 illustrates an exemplary root cause analysis module analyzing occurrences of all internal and external events to identify the root cause event, according to various embodiments.

When the alarm module 118 generates an alarm indicating a data quality anomaly, the root cause analysis module 120 determines a root cause event for the data quality anomaly. The root cause event may be the event which has actually resulted in the alert being generated. For example, when a parent job fails, some of the jobs succeeding the parent job may also fail and would result in an alert being generated. In this exemplary scenario, the parent job may be the root cause event as the parent job triggered the failure of all other jobs resulting in the alert generation. As illustrated in FIG. 3, the root cause analysis module 120 may analyze occurrences of all events (e.g. job failure 304, server maintenance 306, external events 308, etc.) during the analysis 300 to identify the root cause event 302. According to various embodiments, the root cause analysis module 120 may assign a weight to every node. The weight of a node may represent how often the node is a root cause event.

According to various embodiments, the root cause analysis module 120 may determine the probability of each node failing (e.g. for internal events such as jobs) or occurring (e.g. for external events such as maintenance or special events), and being a root cause for the data quality anomaly. The probability of a given node being a root cause of the data quality anomaly may be represented by:

P(Root Cause∩Occurence)=P(Root Cause|Occurrence)*P(Occurence)

The root cause analysis module 120 may then calculate occurrence score for each node based on P(Occurrence) of that node. The occurrence score of a given node is a function of performance metrics (e.g. runtime, delay time, histogram count) of the node itself, the parent nodes, and the child nodes. The occurrence score of a given node may be represented as:

Occurrence Score(s)=f(Self metrics,Parent metrics, Child metrics)

According to various embodiments, maintenance occurrence/non-occurrence, probability of a special event being a sports event, disaster or a festival, etc. may be a metric.

As provided above, the root cause analysis module 120 may assign a weight (w) to each node. The weight may be a measure of a probability of the node occurrence being the root cause of a data quality anomaly (e.g. data disparity), represented as P(Root Cause |Occurrence). According to various embodiments, the weight for a given node may initially be set to 1 and the weight may change with training of the machine learning model.

For example, initial weight of 1 may be assigned to two events A and B. In response to a first data disparity alert, the machine learning model discussed herein may identify the event A as the root cause of a data disparity at a data warehouse. The weight associated with event A may be increased from 1 to, for example, 2, as the probability of the even A being the root cause of a data disparity has increased. In some embodiments, the increase in the weight may be based on a predetermined formula. Subsequently, a second alert may be generated in response to a second data disparity and the model may identify the event A as being the root cause of the second data disparity as well. The weight associated with event A may be increased from 2 to, for example, 3, as the probability of the even A being the root cause of the data disparity has further increased. A third data disparity alert may be generated in response to a third data disparity detected at the data warehouse. The root cause of the third data disparity may be identified as event B. The weight associated with event B may be increased from 1 to, for example, 2, as the probability of the even B being the root cause of a data disparity has increased. According to various embodiments, the weight assigned to an event/node may be stored along with historical data indicating the frequency of the associated event becoming a root cause of a data disparity.

The occurrence score s is calculated as follows:

Occurrence Score(s)=$\sqrt{(r^2+o^2+st^2)/3}$ or

Occurrence Score(s) = $\sqrt{\{(\log(1 + |r|)^\wedge 2 + \log(1 + |o|)^\wedge 2 + \log(1 + |st|)^\wedge 2\}/3}$ where:
Runtime error (r)=(Self Runtime–Average Parent Runtime)–E[(Self Runtime–Average Parent Runtime)]
Offset error (o)=(Self Offset–Maximum Parent Offset)–E[(Self Offset–Maximum Parent Offset)]
Start Time error (st)=(Self Start Time–Maximum Parent Start Time)–E[(Self Start Time–Maximum Parent Start Time)]
where E[x] represents the excepted value of x. If the data is time series data, Holt-winters algorithm may be used for prediction of the excepted value of x.

According to various embodiments, for internal events (e.g. maintenance events), the occurrence score of the node representing the event may be set to 0 if the event does not occur (e.g. maintenance does not occur). If the event occurs, the occurrence score may be set to be the sum of occurrence scores of the children nodes of the event, and the occurrence scores of the children nodes may then be reset to 0.

For external events (e.g. holiday events), the occurrence score of the node representing the event may be set as the Impact Score*(Sum of occurrence scores of the children nodes). The occurrence scores of the children nodes may then be reset as (1−Impact Score)*(Current Occurrence score of the child).

As provided above, the root cause analysis module 120 may identify, for a given monitoring event E represented by a note in the dependency graph, parent events P and children events C of the event E. The root cause analysis module 120 may then calculate node score as a function of the weight w and the occurrence score s for each node (i.e. α=f(w, s)). According to various embodiments, the node score may be calculated as:

$$\alpha_i = \frac{w_i \cdot s_i}{\sum_{\forall j} w_j \cdot s_j}$$

Embodiments predict the node with the highest a as being the root cause of the data quality anomaly. If an actual root cause of the data quality anomaly is later identified to be a different node, the root cause analysis algorithm may need to be updated (i.e. trained). According to various embodiments, the algorithm may be trained (e.g. to identify the actual root cause in the root cause analysis) by adjusting the weight w of the nodes. For example, the weights may be adjusted by adding Δw to train the algorithm.

If the actual root cause node does not exist in the current node lineage (e.g. in the current dependency graph), the actual root cause node may be added to the current dependency graph, and an initial weight of 1 may be assigned to the new node (i.e. the actual root cause node). According to various embodiments, the actual root cause node may be added to the current dependency graph using a thresholded cross-correlation and redundancy removal technique, as discussed below in greater detail.

If the actual root cause node exists in the current node lineage (e.g. in the current dependency graph), the error in the algorithm may be determined depending on whether the weight of the identified root cause node is lower or greater than the weight of the actual root cause node. That is, for a root cause node i, if $\alpha_i > \alpha_j \forall j \neq i$, then the error may be determined as Error(ε)=0.5*((1−$\alpha_i$)²+Σ$\alpha_j^2 \forall j \neq i$).

On the other hand, if αi<αj then wi·si<wj·sj for some node j, then the weight for node i (i.e. $w_i$) may be increased to correct the inequality and reduce the error (i.e. wi=wi+Δwi).

Figure 4:
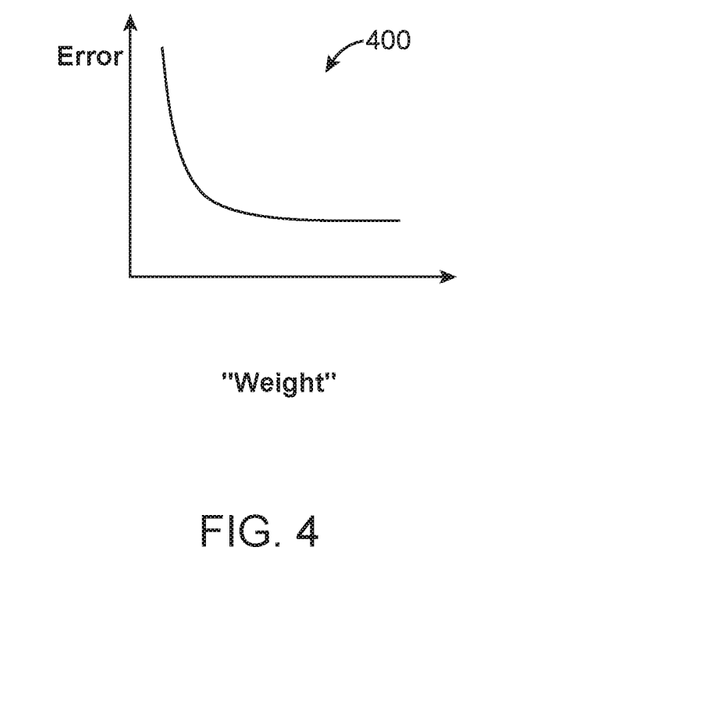
FIG. 4 illustrates exemplary correlation between the error associated with the nodes and the weights assigned to the nodes, according to various embodiments.

According to various embodiments, the training may be done either on the entire training set (e.g. stochastically) or on a predetermined batch size (e.g. for each instance that is batch size one). When training stochastically (e.g. for the entire batch) the training may be such that the training reduces the overall error below a preset threshold. In some embodiments, the error may be reduced by a fixed amount per training example. Increasing weights $w_i$ infinitely will make the error zero but will also result in the weights being biased to the training example, referred as overfitting. FIG. 4 illustrates graph 400 showing the correlation between the error and the weights. The graph 400 shows that when the weights are increased infinitely, the error per training instance approaches zero. However, even though the error on the training set continues to gradually decrease, the error on the test set will increase towards the end as a result of overfitting. This is related to the network beginning to find and fine-tune to idiosyncrasies in the data, rather than to general properties.

According to various embodiments, biased weights may be avoided by taking the $\Delta w_i$ to be proportional to $|\partial \varepsilon / \partial w_i|$ and increase it accordingly.

$$\partial \varepsilon / \partial w_i = \frac{\alpha_i * \left[(1-\alpha_i)^2 + \sum_{\forall j \neq i} \alpha_j^2\right]}{w_i}$$

$$\Delta w_i = \gamma * \partial \varepsilon / \partial w_i = \gamma * \frac{\alpha_i * \left[(1-\alpha_i)^2 + \sum_{\forall j \neq i} \alpha_j^2\right]}{w_i}$$

$$w_i = w_i + \gamma * \frac{\alpha_i * \left[(1-\alpha_i)^2 - + \sum_{\forall j \neq i} \alpha_j^2\right]}{w_i}$$

where γ is the learning rate hyper-parameter (i.e. the value for γ is set before the learning process begins. The learning rate may indicate how quickly the system updates the parameters According to an illustrative example, for three nodes (n1, n2, n3), each having weight(w)=1, embodiments may generate the following scores: s1=0.5, s2=0.3, s3=0.2. Based on the relationship among the scores (i.e. s1>s2>s3), the event represented by n1 may be predicted as the root cause event for a data quality anomaly. Thereafter, if the actual root cause event for the data quality anomaly is revealed to be the node represented by n2, the weights may be updated as follow: w1=1, w2=2, w3=1. Now the values become w1·s1=0.5, w2·s2=0.6, w3·s3=0.2 thus w2·s2>w1·s1>w3·s3 and the machine learning model may correctly predict the node n2 to be the root cause event for the data quality anomaly.

Thresholded Cross-Correlation and Redundancy Removal (TCRR)

Correlation between two variables may refer to the relatedness of the variables in some form. Correlated variables may contain information about each other. The stronger the correlation between two variables, the more one variable conveys information about the other. The correlation may be a positive correlation where when one variable increases, the other variable also increases and when one variable decreases the other variable also decreases. The correlation may be a neutral correlation, also referred as no correlation or zero correlation where there is no relationship between the two variables such that the value of one variable changes and the other variable remains constant. The correlation may be a negative correlation which is a correlation where when one variable increases, the other variable decreases, and when one variable decreases the other variable increases.

The level of the linear correlation between two variables may be represented using Pearson Correlation Coefficient which is the covariance between two vectors, normalized by the product of their standard deviations. The Pearson Correlation Coefficient ρ for variables x and y may be expressed as:

$$\text{Cov}(x, y) = \frac{\sum_i^N (x_i - \bar{x})(y_i - \bar{y})}{N - 1}$$

-continued $$\rho_{xy} = \frac{\text{Cov}(x, y)}{\sigma_x \sigma_y}$$

where σx and σy are the standard deviations of variables x and y.

When considering correlation among continuous functions, cross-correlation may refer to the similarity of the two series (e.g. f and g) as a function of the displacement of one relative to the other. For discrete functions f and g, the cross-correlation may be expressed as:

$$(f * g)[n] \stackrel{def}{=} \sum_{m=-\infty}^{\infty} f^*[m] g(m+n).$$

Accordingly to some embodiments, the normalized value of cross-correlation may be used in calculations.

Each of the node (or event) in a dependency graph may consist of historical data that can be represented by a time series. A new node to be added to the dependency graph may also be represented by a time series. When the new node is added to an existing dependency graph, the cross-correlation between the time series may be determined. Then, the TCRR method may be followed to add the new node to the dependency graph. Lags limit and the threshold may be determined by the user using brute force.

Figure 5A:
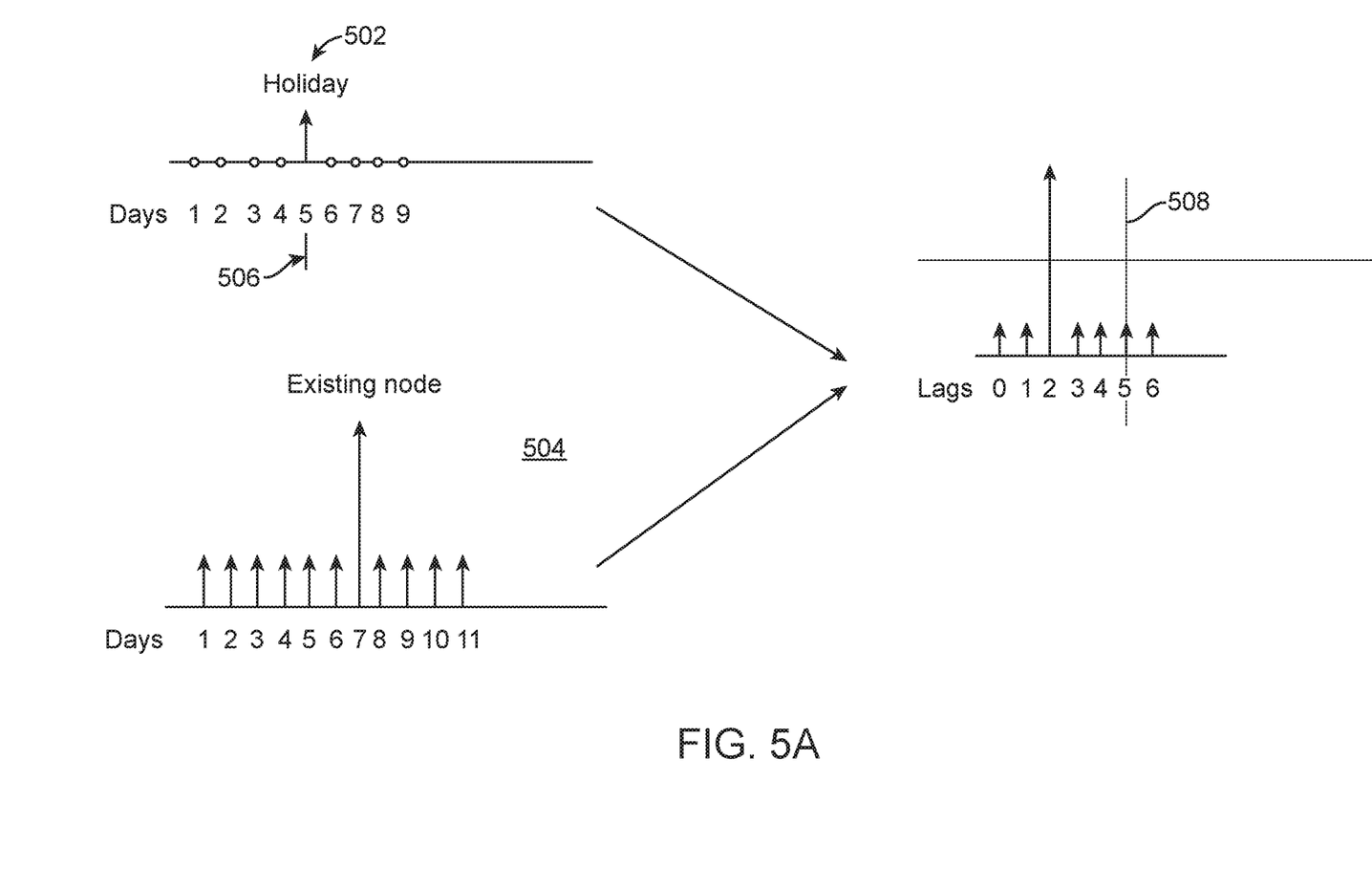
FIG. 5A illustrates adding a node to an existing dependency graph using the thresholded cross-correlation and redundancy removal technique, according to various embodiments.

In an exemplary embodiment illustrated in FIG. 5A, an external node 502 related to holiday event may be added to a dependency graph 504. The holiday event may raise transaction volume on a transaction processing network about 2 days later and may result in an alarm. If the holidays are modeled as a spike on the holiday day 506 (e.g. day 5) then when the time series for the new holiday event node 502 is cross-correlated with the nodes of the existing dependency graph 504, the nodes which are affected by this node will have some abnormal behavior in general and will show spike in cross-correlation in a point in time in near future (e.g. next 2-3 days). With a suitable lag limit 508 (e.g. 5 days in this exemplary embodiment) and threshold 510, the relevant dependent nodes may be identified and the redundant nodes may be removed from the dependency graph 504 by the redundancy removal method.

According to the exemplary TCRR method described herein, a lags limit may be used to eliminate potential high cross-correlation that may occur after a long time between two nodes. Such cross-correlation has no practical significance and, as such, should not be considered. The lags limit may help to eliminate cross-correlations that are of no significance. In the exemplary embodiment illustrated n FIG. 5A, a 1-year limit might be sufficient to observe annual patterns, or a 7-days limit might be for sufficient to observe weekly patterns.

Figure 5B:
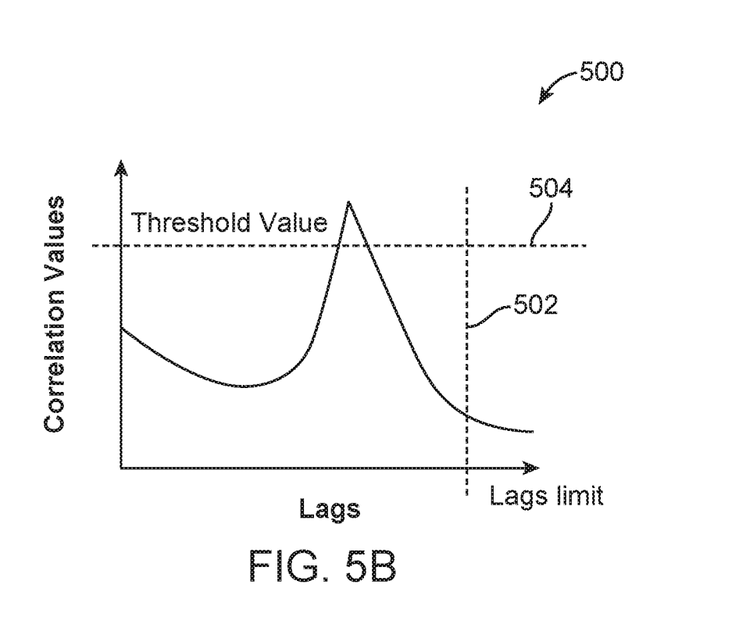
FIG. 5B illustrates a graph for thresholded cross-correlation, according to various embodiments.

According to various embodiments, two variables may be considered to be dependent on each other if the correlation value crosses a threshold within demarcated lags limit, as illustrated in FIG. 5B. This may be referred as a thresholded cross-correlation.

Figure 6A:
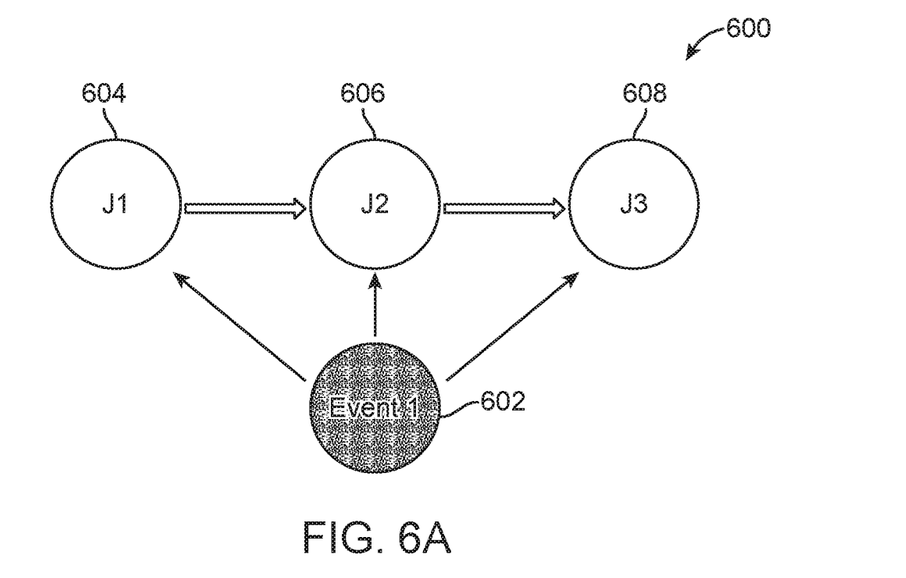
FIGS. 6A-6B illustrate the concept of redundancy removal, according to various embodiments.
Figure 6B:
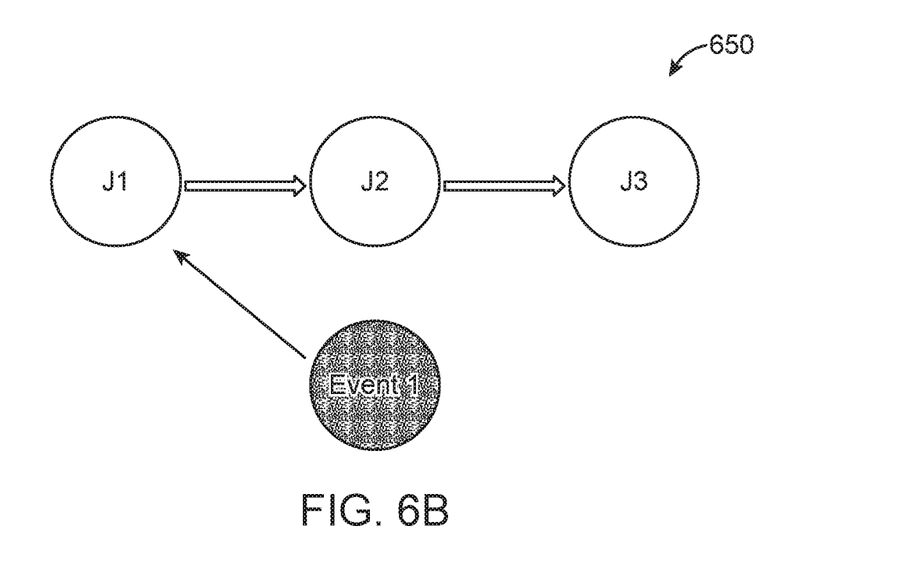

FIGS. 6A-6B illustrate redundancy removal in an exemplary dependency graph. For example, for a given dependency graph 600, embodiments may identify a first node J1 604, a second node J2 606 and a third node J3 608 as being dependent on a first event represented by node 602 using thresholded cross-correlation. As illustrated in FIG. 6A, the first node J1 604, the second node J2 606 and the third node J3 608 may have an internal lineage where the second node J2 606 is dependent on the first node J1 604. In addition, the third node J3 608 is dependent on the second node J2 606. Using redundancy removal, embodiments may remove the connection between the first event node 602 and the second node J2 606, as well as the connection between the first event node 602 and the third node J3 608. The resulting dependency graph 650 is illustrated in FIG. 6B.

According to various embodiments, the thresholded cross-correlation and redundancy removal technique may be used to add a new node to an existing dependency graph. For example, as explained above, if the actual root cause node does not exist in a given dependency graph, the actual root cause node may be added to the dependency graph using the thresholded cross-correlation and redundancy removal technique. As explained above, an exemplary implementation of the TCRR technique may include determining the time series of all the nodes and the new nodes, performing cross-correlation of the time series of new node and the existing nodes; identifying all nodes such that within the lags limit the threshold is crossed; for such a set of selected nodes, removing the nodes whose parent is also in the set; and adding the new node to the dependency graph with the remaining nodes in the above set as its child nodes.

In some embodiments, in a given dependency graph, every job node may represent a job running in the system. A job collector may collect all the information related to the job from different sources (e.g. databases). The information may include information related to a job start timestamp, job end timestamp, job runtime, etc. According to various embodiments, the performance of a job may be measured based on the runtime of the job, the delay time of the job and frequency of the job running.

Figure 7A:
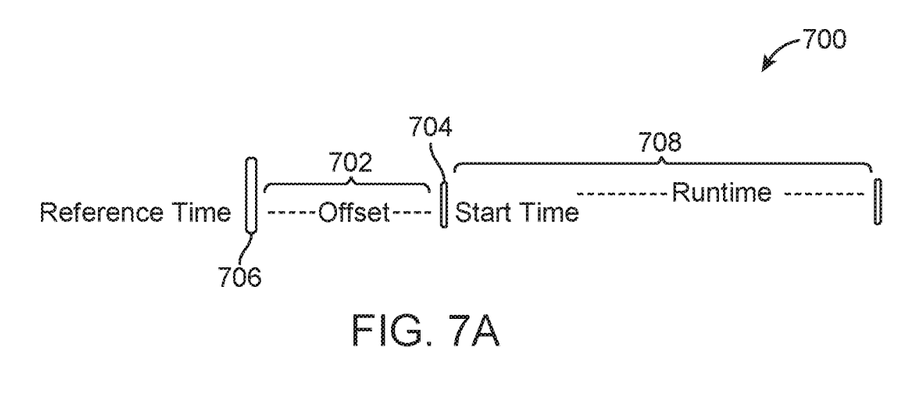
FIG. 7A-7B illustrate limited failure information about a job consisting of the fact that a failing job runs longer than a non-failing job to completion, according to conventional systems.
Figure 7B:
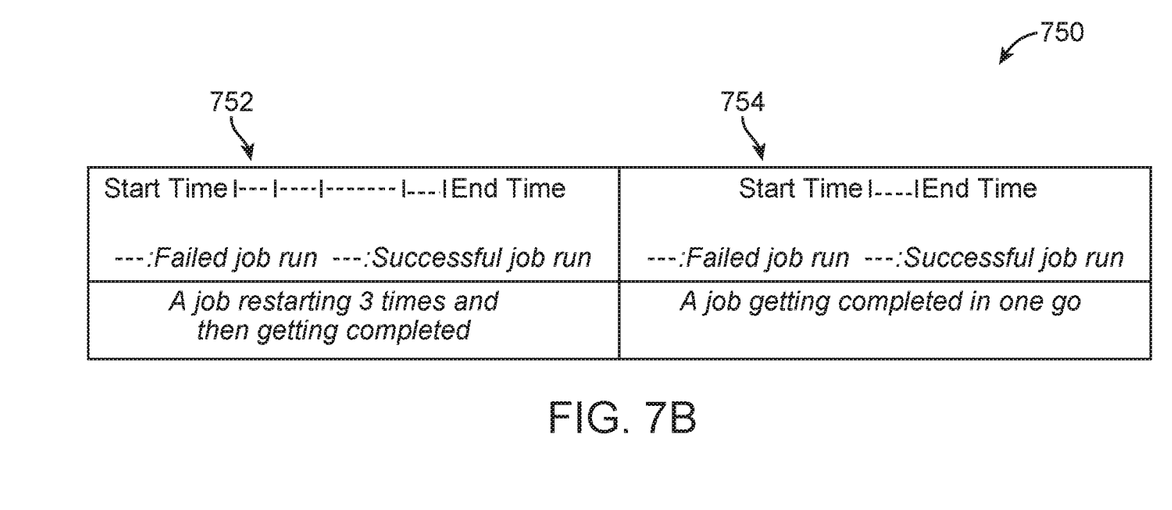

As illustrated in FIG. 7A, an exemplary job may be represented by a time series 700 with every new job run as a spike 704 in the series 700. The start time 704 of the job may account for the number of times the job is inserted in the system during a specific time duration i.e. the frequency of the job. The offset 702 of the job may account for the anomalies due to delays in starting of the job from a reference time 706. As illustrated in FIG. 7B, in conventional systems, failure information about a job consists of the fact that a failing job runs longer than a non-failing job to completion as the restart times are included in the runtime. Embodiments predict and/or identify the root cause event that caused a job to fail.

Figure 8:
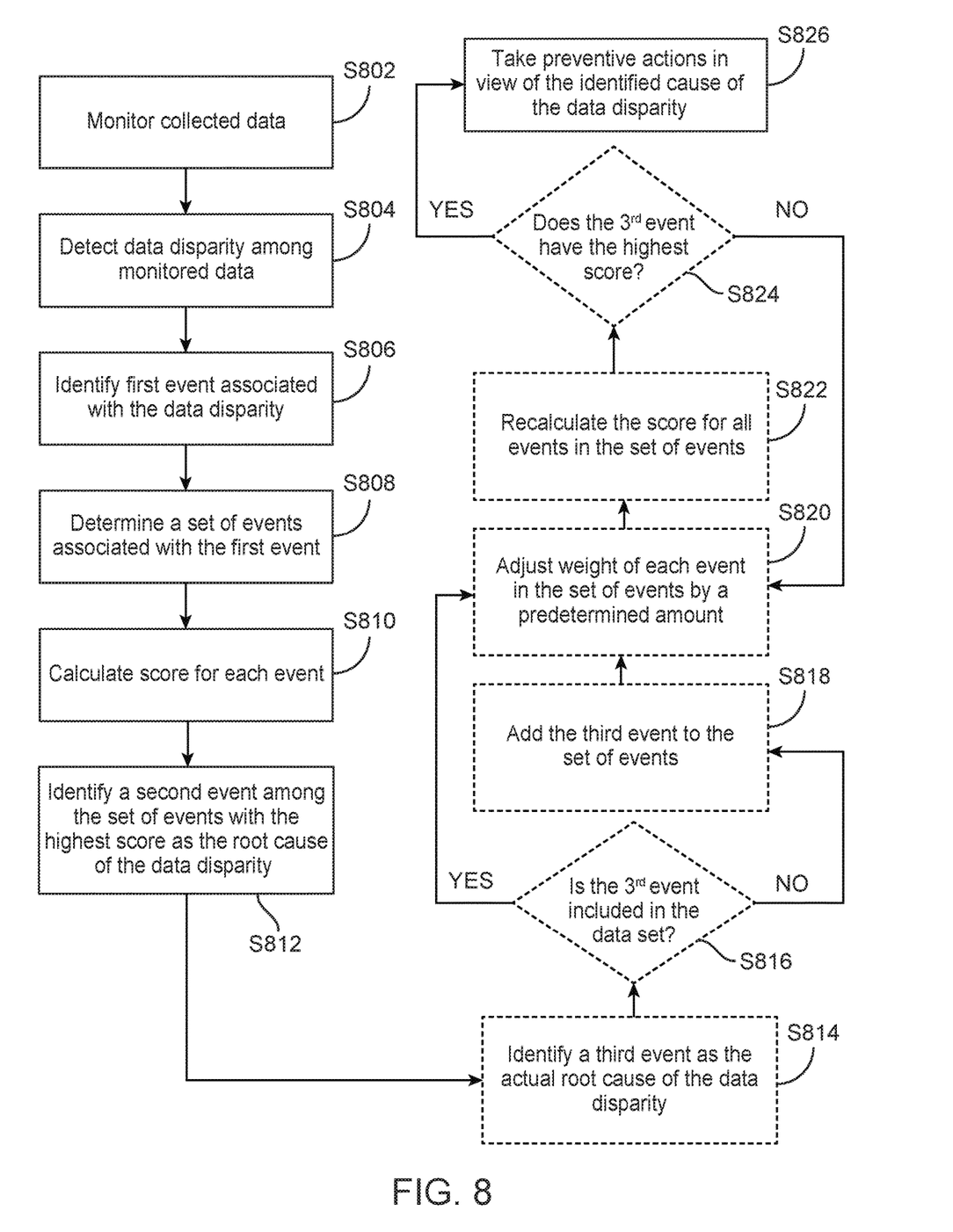
FIG. 8 illustrates an exemplary process flow for identifying an event as a root cause of a data disparity and taking preventive action in view of the identified event, according to various embodiments.

FIG. 8 shows an exemplary process flow for identifying an event as a root cause of a data disparity and taking preventive action in view of the identified event. At S802, the server computer monitors parameters associated with data collected in connection with a processing computer. At S804, the server computer detects a data disparity among the data. At S806, the server computer identifies a first event associated with the data disparity. At S808, the server computer determines a set of events associated with the first event. At S810, the server computer, calculates a score for each event among the set of events as a function of a weight assigned to each event among the set of events and occurrence score determined for each event among the set of events. At S812, the server computer identifies a second event among the set of events as the cause of the data disparity, wherein the second event has the highest score among the set of events. The server computer may then take preventive actions to prevent the data disparity in view of the identified cause of the data disparity at S826. In some embodiments, after S812, the server computer may identify a third event as an actual cause of the data disparity at S814.

At S816, the server computer may determine whether the third event is included in the set of events. If the answer to S816 is YES (i.e. the third event is included in the set of events), the server computer adjusts the weight of each event among the set of events by a predetermined amount, wherein adjusting includes increasing the weight of the third event at S820. If the answer to S816 is NO (i.e. the third event is not included in the set of events), then the server computer adds the third event to the set of events at S818 and moves to S820. The server computer then recalculates the score for each event among the set of events such that the third event has the highest score among the set of events at S822. At S824, the server computer may determine whether the third event has the highest score. If the answer to S824 is YES (i.e. the third event has the highest score), then the process moves to S826 where the server computer takes preventive actions to prevent the data disparity in view of the identified cause of the data disparity. If the answer to S824 is NO (i.e. the third event does not have the highest score), then the process returns to step S820 to adjust the weights and to step S822 to recalculate the scores.

In an exemplary embodiment, a job related to uploading transaction data to a database may have failed. The failure may cause a data quality indicator monitoring daily transaction volume to generate an alert due to the dip in data volume. Embodiments discussed herein may identify all the events (nodes) in the dependency graph that could have caused the alert. Embodiments may then generate scores and the three errors (i.e. runtime error, offset error, start time error) for each node in an effort to identify whether the alert is generated due to excessive runtimes/failures, delayed offset and/or problems in frequency of jobs. A trained machine learning model may identify the job related to transaction data as the root cause node. If the model fails to identify the actual job as the root cause job, the feedback mechanism discussed above may adjust the weights to train the model accordingly.

In an exemplary embodiment, a spike in transaction volume monitored, for example, by a data quality indicator, may be identified. The spike may be due to a special external event (e.g. Thanksgiving Day). The indicator may generate an alert which needs to be investigated. Embodiments discussed herein may predict the special external event to be the root cause of the alert by selecting the probable nodes from dependency graph and ranking the scores generated for these nodes. Embodiments may first calculate the scores for all the nodes in the job failure cluster(s) as these scores may form the basis of calculations for node scores in other clusters. Embodiments may then calculate the scores for the jobs in other clusters. Embodiments may identify the top ranked node among all clusters as the root cause of the alert. A trained machine learning model may identify the special external event as the root cause node. If the model fails to identify the special external event as the root cause job, the feedback mechanism discussed above may adjust the weights to train the model accordingly.

Embodiments have a number of advantages. For example, embodiments can identify internal events, as well as external events to a data warehouse, as the root cause of a data quality anomaly observed at the data warehouse. According to various embodiments, the actual root cause may be a node that already exists in the data dependency graph. In other embodiments, the actual root cause may not be a part of the data dependency graph and may be added using the thresholded cross-correlation and redundancy removal technique described herein.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for identifying a cause of data disparity among monitored data, the method comprising:
   monitoring, using a server computer, parameters associated with data collected in connection with a processing computer;
   detecting, using the server computer, a data disparity among the data;
   identifying, using the server computer, a first event associated with the data disparity;
   determining, using the server computer, a set of events associated with the first event, wherein an event among the set of events represents an occurrence that impacts at least one of an amount of data processed by, or a processing speed of, the processing computer, wherein the set of events include one or more internal events internal to an organization comprising the processing computer and one or more external events external to the organization;

calculating, using the server computer, a score for each event among the set of events as a function of a weight assigned to each event among the set of events and occurrence score determined for each event among the set of events, wherein the weight assigned to each event among the set of events is a measure of probability of that event being the cause of the data disparity, wherein the occurrence score for the event includes a sum of occurrence scores of child events of the event;

identifying, using the server computer, a second event among the set of events as the cause of the data disparity, wherein the second event has the highest score among the set of events; and taking remedial or preventive actions to address the data disparity in view of the second event being the identified cause of the data disparity.

2. The method of claim 1, wherein the occurrence score of a selected event is determined based on runtime characteristics of all child events and parent events of the selected event, wherein the selected event occurred prior to the all child events of the selected event, and all parent events of the selected event occurred prior to the selected event.

3. The method of claim 1, further comprising, prior to taking the remedial or preventive actions:
identifying a third event, different than the second event, as an actual cause of the data disparity;
determining that the third event is included in the set of events;
adjusting the weight of each event among the set of events by a predetermined amount, wherein adjusting includes increasing the weight of the third event; and
recalculating the score for each event among the set of events.

4. The method of claim 3, further comprising two or more iterations of adjusting and recalculating, wherein the score of the third event increases at each iteration such that the third event has the highest score among the set of events at conclusion of all iterations.

5. The method of claim 1, wherein the weight of a given event is stored along with a history of the given event being an actual cause of the data disparity.

6. The method of claim 1, further comprising, prior to taking the remedial or preventive actions:
identifying a third event, different than the second event, as an actual cause of the data disparity;
determining that the third event is not included in the set of events;
adding the third event to the set of events;
adjusting the weight of each event among the set of events by a predetermined amount, wherein adjusting includes increasing the weight of the third event; and
recalculating the score for each event among the set of events.

7. The method of claim 6, further comprising two or more iterations of adjusting and recalculating, wherein the score of the third event increases at each iteration such that the third event has the highest score among the set of events at conclusion of all iterations.

8. The method of claim 1, further comprising:
receiving an alert associated with the data disparity;
in response to the alert, identifying the first event associated with the data disparity.

9. The method of claim 1, wherein the set of events associated with the first event includes one or more parent events of the first event, wherein the one or more parent events occurred prior to the first event.

10. The method of claim 1, wherein the first event and the set of events form a dependency graph, the method further comprising:
adding a new event to the dependency graph, wherein the new event is associated with a third event and a fourth event in the set of events, wherein the fourth event is a descendent of the third event;
associating the new event with the third event without associating with the fourth event.

11. The method of claim 1, wherein the weight assigned to the first event among the set of events has a first value for the data disparity and a second value for another data disparity.

12. A computer comprising:
a processor; and
a computer readable medium, the computer readable medium comprising code that, when executed by the processor, cause the processor to:
monitor parameters associated with data collected in connection with a processing computer;
detect a data disparity among the data;
identify a first event associated with the data disparity;
determine a set of events associated with the first event, wherein an event among the set of events represents an occurrence that impacts at least one of an amount of data processed by, or a processing speed of, the processing computer, wherein the set of events include one or more internal events internal to an organization comprising the processing computer and one or more external events external to the organization;
calculate a score for each event among the set of events as a function of a weight assigned to each event among the set of events and occurrence score determined for each event among the set of events, wherein the weight assigned to each event among the set of events is a measure of probability of that event being the cause of the data disparity, wherein the occurrence score for the event includes a sum of occurrence scores of child events of the event;
identify a second event among the set of events as the cause of the data disparity, wherein the second event has the highest score among the set of events; and
take remedial or preventive actions to address the data disparity in view of the second event being the identified cause of the data disparity.

13. The computer of claim 12, wherein the occurrence score of a selected event is determined based on runtime characteristics of all child events and parent events of the selected event, wherein the selected event occurred prior to the all child events of the selected event, and all parent events of the selected event occurred prior to the selected event.

14. The computer of claim 12, wherein the code, when executed by the processor, further causes the processor to:
prior to taking the remedial or preventive actions:
identify a third event, different than the second event, as an actual cause of the data disparity;
determine that the third event is included in the set of events;
adjust the weight of each event among the set of events by a predetermined amount, wherein adjusting includes increasing the weight of the third event; and
recalculate the score for each event among the set of events.

15. The computer of claim 12, wherein the weight of a given event is stored along with a history of the given event being an actual cause of the data disparity.

16. The computer of claim 12, wherein the code, when executed by the processor, further causes the processor to:
prior to taking the remedial or preventive actions:
identify a third event, different than the second event, as an actual cause of the data disparity;
determine that the third event is not included in the set of events;
add the third event to the set of events;
adjust the weight of each event among the set of events by a predetermined amount, wherein adjusting includes increasing the weight of the third event; and
recalculate the score for each event among the set of events.

17. The computer of claim 12, wherein the code, when executed by the processor, further causes the processor to:
receive an alert associated with the data disparity;
in response to the alert, identify the first event associated with the data disparity.

18. The computer of claim 12, wherein the set of events associated with the first event includes one or more parent events of the first event, wherein the one or more parent events occurred prior to the first event.

19. The computer of claim 12, wherein the first event and the set of events form a dependency graph, and wherein the code, when executed by the processor, further causes the processor to:
add a new event to the dependency graph, wherein the new event is associated with a third event and a fourth event in the set of events, wherein the fourth event is a descendent of the third event;
associate the new event with the third event without associating with the fourth event.

* * * * *